United States Patent
Hakulinen et al.

(12) 
(10) Patent No.: US 6,178,924 B1
(45) Date of Patent: Jan. 30, 2001

(54) METHOD FOR UPGRADING A BOILER

(75) Inventors: Aki Hakulinen; Kari Haaga, both of Tampere (FI)

(73) Assignee: Kvaerner Pulping Oy, Tampere (FI)

(*) Notice: Under 35 U.S.C. 154(b), the term of this patent shall be extended for 0 days.

(21) Appl. No.: 09/308,906

(22) PCT Filed: Dec. 18, 1997

(86) PCT No.: PCT/FI97/00805

§ 371 Date: Jul. 21, 1999

§ 102(e) Date: Jul. 21, 1999

(87) PCT Pub. No.: WO85/27384

PCT Pub. Date: Jun. 25, 1998

(30) Foreign Application Priority Data

Dec. 19, 1996 (FI) ........................................ 965135
Feb. 3, 1997 (FI) ........................................ 970438

(51) Int. Cl.$^7$ ........................................ F22D 1/00
(52) U.S. Cl. ................ 122/7 R; 122/4 D; 122/235.33
(58) Field of Search ................... 122/4 D, 7 R, 122/235.11, 235.33, 209.1; 110/234

(56) References Cited

U.S. PATENT DOCUMENTS

| | | | |
|---|---|---|---|
| 1,072,598 | 9/1913 | Geoghegan | 122/485 |
| 1,411,704 | 4/1922 | Broido | 122/476 |
| 4,449,485 | * 5/1984 | Tan | 122/209.1 |
| 4,473,032 | 9/1984 | Maintok | 122/4 D |
| 4,664,067 | 5/1987 | Haneda et al. | 122/7 R |
| 5,299,534 | 4/1994 | Janka | 122/477 |

FOREIGN PATENT DOCUMENTS

| | | |
|---|---|---|
| 125711 | 12/1901 | (DE). |
| 545 196 | 2/1932 | (DE). |
| 42 18 016 A1 | 12/1993 | (DE). |
| 0 075 041 A1 | 3/1983 | (EP). |
| 0 198 758 A1 | 10/1986 | (EP). |
| 80142 | 12/1989 | (FI). |
| WO 94/09206 | 4/1994 | (WO). |

OTHER PUBLICATIONS

Derwent's Abstract, No. 90–183329/24, week 9024, Abstract of SU, 1525400 (S Heat Eng Res Inst), 1989.
Derwent's Abstract, No. J1010 E/27, week 8227, Abstract of Su, 861837 (Alikhov NN), 1981.

* cited by examiner

*Primary Examiner*—Denise L. Ferensic
*Assistant Examiner*—Jiping Lu
(74) *Attorney, Agent, or Firm*—Pollock, Vande Sande & Amernick, R.L.L.P.

(57) ABSTRACT

A method for upgrading a boiler is provided. When operating at a first capacity, the boiler is used such that an open space is kept in radiation communication with a firebox. The open space is also kept as empty. A first set of water circulation tubes are connected to the boiler cylinder in connection with the ascending tubes. When the boiler is operated at a second capacity, which is higher than the first capacity, at least one additional part is arranged in the open space to expand the basic super heater arrangement. Additionally, or alternatively at the second capacity, a second set of water circulation tubes may be connected to the boiler cylinder in connection with the ascending tubes. The second set of water circulation tube has a capacity exceeding that of the first set of water circulation tubes.

14 Claims, 7 Drawing Sheets

METHOD FOR UPGRADING A BOILER

FIELD OF THE INVENTION

The invention relates to a method in a boiler, particularly a chemical recovery boiler,

BACKGROUND OF THE INVENTION

Boiler plants, particularly chemical recovery boiler plants are conventionally dimensioned and constructed to operate within a certain, designed power range and capacity. This is naturally reasonable in view of optimization of return for investments. Recently, however, it has become increasingly obvious that the basic dimensioning and design of chemical recovery boiler plants for a certain capacity will involve problems. Expansion of a chemical pulp mill or rationalization and improvement of the process in a chemical pulp mill will naturally increase pulp production. Thus a clear need will also arise to increase the capacity, i.e. the efficiency, of the chemical recovery boiler. Consequently, as the chemical recovery boiler is being dimensioned and designed as a compact construction operating in a certain capacity range, an increase in the capacity or the efficiency may be impossible or it may require very large investments and long downtimes.

In the above-described situation, one of the most significant and serious problems is the insufficiency of the heat transfer area of the superheaters, or the superheater arrangement, designed according to the basic dimensioning of the chemical recovery boiler plant with the new, higher heat load. Moreover, the higher heat load increases the flow rate and temperatures of the flue gases in the superheating area and on the heating surfaces after it. As a result of a rise in the temperatures in the superheating area and on the heating surfaces after it, plugging may be caused, thus impairing the availability of the boiler.

Due to an increase in the effect, or the capacity, of the chemical recovery boiler, the following problems may occur in the superheating arrangement:

The open space between the front edge of the superheating arrangement and the front wall of the boiler is so small that it will be impossible to place a new, supplementary superheating of sufficient size in this open space, due to lack of space.

It a new superheater is installed in the open space, it will decrease the heat flow to the existing screen tubes to such an extent that their water circulation will be endangered. This arises up in chemical recovery boilers having a vertical screen tube system in front of the superheater arrangement.

Due to the increased efficiency, or capacity, it will also be necessary to reduce the temperature of flue gases entering the superheater arrangement and the heating surfaces after it so that excessive flue gas temperatures will not increase the plugging tendency in the area of the superheater arrangement and, particularly, in the boiler bank area. However, it is difficult to lower the temperature of flue gases in compact, conventionally designed chemical recovery boiler constructions, because in normal chemical recovery boiler constructions it is difficult to add tube sections for lowering the temperature of the flue gases in an economical way.

The quantity (flow rate) and temperature of the flue gases will rise, wherein the risk of plugging increases in the superheater area as well as in the sections of riser tubes in the boiler bank area and in the economizer area.

It is feasible that a vertical screen tube system could be placed in front of the superheater arrangement, but it involves a risk of damage, because this structure is not sufficiently rigid, and tubes are usually long in this kind of structure. Such a structure can easily vibrate e.g. as a result of soot blowing, wherein the penetration points of the elements are susceptible to damage. Further, falling clods of salt may damage the long elements.

SUMMARY OF INVENTION

In present invention, it was surprisingly found that it is possible to increase the capacity of boiler plants, particularly chemical recovery boiler plants, afterwards in a way that the demands for raising the capacity or the efficiency, particularly concerning the rise in the temperature of the flue gases, can be taken into account in the operation and construction of the boiler plant, particularly chemical recovery boiler plant, as early as when designing the boiler, wherein the alteration work to be carried out later is simple and the alteration investment inexpensive.

When operating in the first efficiency range of the method according to the invention, the boiler is used in a way that the open space is kept in radiation contact with the furnace and substantially empty, and further, a first embodiment of the water circulation arrangement is used between the riser tubes and the boiler drum. On the other hand, when the boiler, particularly chemical recovery boiler, is operated in the second or in other efficiency ranges exceeding the first efficiency range, the boiler is used in a way that at least one element expanding the superheater arrangement is placed in the open space and/or a second embodiment is formed between the screen riser tubes and the boiler drum, partially in the furnace, wherein a higher efficiency is obtained with the boiler than with the first application.

The above-mentioned solution thus provides a predesigned chemical recovery boiler construction which can be converted by measures according to the method to comprise at least two efficiency ranges, i.e. to correspond to the production of the pulp mill at each time. For raising the efficiency range, the open space arranged for this purpose is converted to accommodate, according to the need determined by the increase in efficiency, one or several parts expanding the superheater arrangement and being further protected with a reliable and safe screen tube system placed in the furnace to lower the temperature of the flue gases. It is also possible to carry out one of these two measures. The screen tube system is a rigid construction with no joints in the flue gas flow area.

BRIEF DESCRIPTION OF THE DRAWINGS

The method of the invention will be described in more detail in the following description with reference to the appended drawings, in which FIGS. 1A, 2A1, 2A2 and 3A show schematically, seen from the side, the upper part of the boiler furnace, particularly a chemical recovery boiler when applying the method of the invention in its first, lowermost efficiency range.

DETAILED DESCRIPTIONS OF THE INVENTION

With reference to the drawings, the boiler, particularly chemical recovery boiler, according to the invention, comprises a front wall 1, a rear wall 2, and side walls 3, 4, as well as a roofing 5. The upper part of the furnace 6 is provided with a nose arch arrangement 7 and basic superheater arrangement 8, and an open space 10 between the front wall 1 and the front edge 9 of the basic superheater arrangement 8, limited in the side direction by the side walls 3, 4 of the boiler, in the upper direction by the roofing 5 of the boiler, and being at its lower edge in contact with the furnace 6 through an opening 11 limited by the tip of the nose arch arrangement 7b, the front wall 1 and the side walls 3, 4.

Figure 1A:
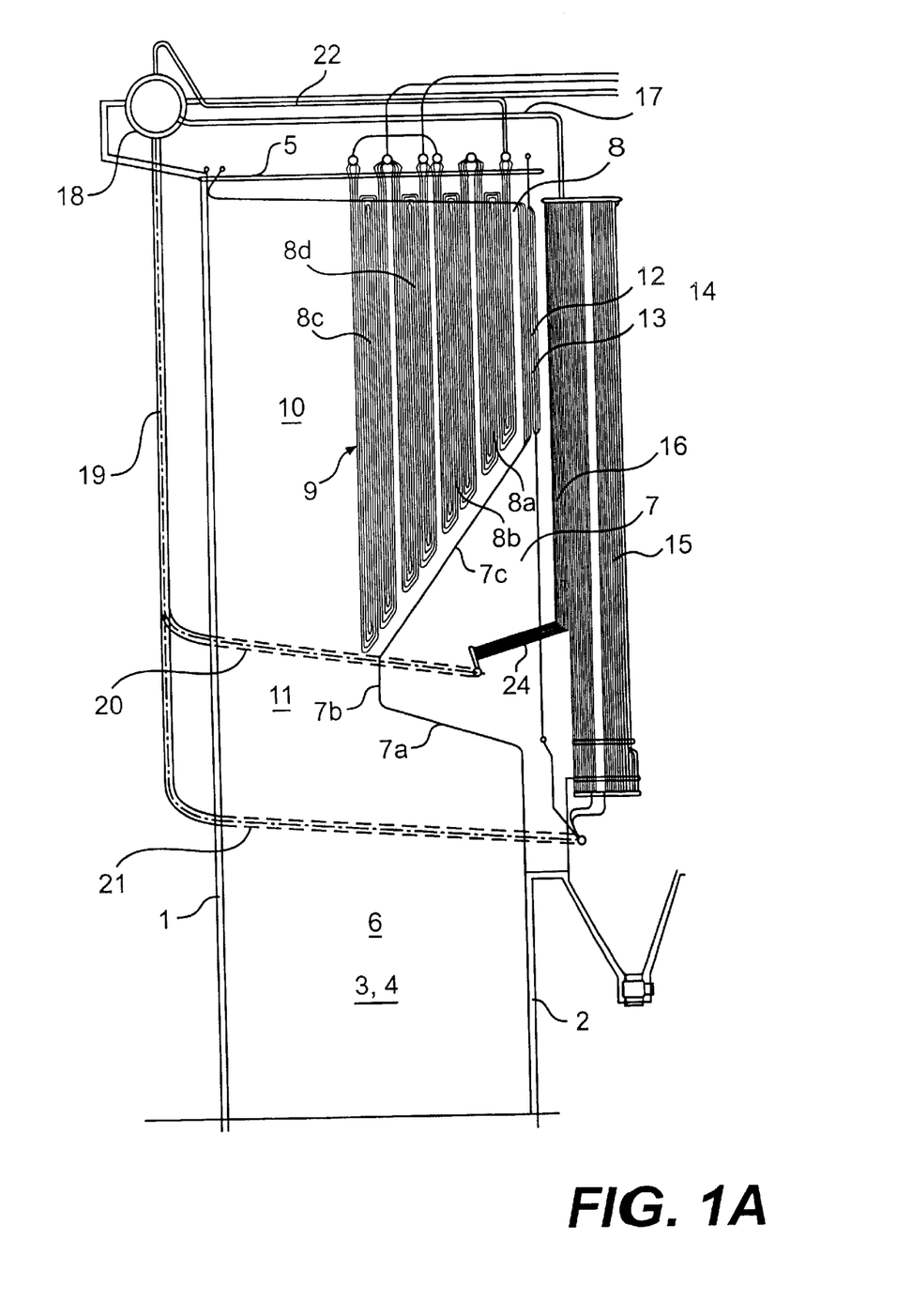
Figure 1B:
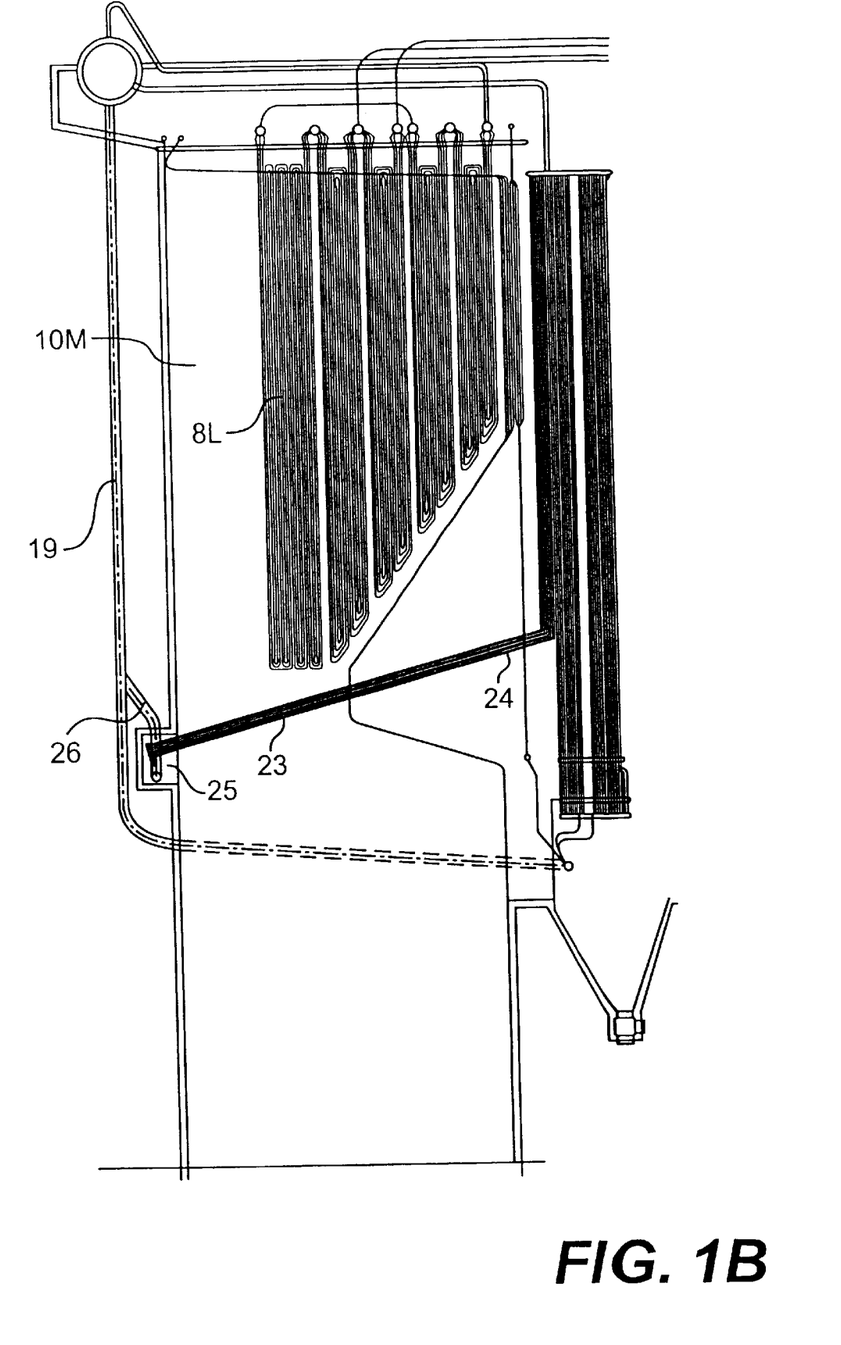
FIGS. 1B, 2B and 3B show the upper parts of the furnace shown in FIGS. 2A, 2A1, 2A2 and 3A after the chemical recovery boiler has been converted according to the method to apply another efficiency range of the method of the invention.

In connection with the rear edge 12 of the basic superheater arrangement 8, there is a so-called grid-tube system 13, through which the flue gases are transferred to a flue gas pass 14 accommodating in a so-called boiler bank area riser tubes 15, 16, some of which, namely the riser tubes placed closest to the grid-tube system 13 in FIGS. 1A, 1B, are steam generating riser tubes 16 of so-called screen tubes 23. Riser tubes 15 constitute a boiler bank. The riser tubes 15, 16 are connected to the boiler drum 18 via upper circulating tubes 17.

Outside and on top of the boiler roofing 5 is the boiler drum 18. In the constructions shown in FIGS. 1A, 2A2 and 3A, first vertical downcomers 19, connected to the lower part of the boiler drum 18 and being part of the water circulation system, connect the boiler drum 18 to second, supplementary downcomer tubes 20, 21 outside the furnace 6 of the boiler and also belonging to the water circulation system, to the steam generating riser tubes 16 (of the screen tubes) on one hand (supplementary downcomer tubes 20) and to the riser tubes 15 forming the boiler bank on the other hand (supplementary downcomer tubes 21). The supplementary downcomer tubes 20, 21 are arranged outside the side walls 3, 4 in the constructions shown in FIGS. 1A, 2A2 and 3A. Consequently, in the embodiment shown in FIGS. 1A, 2A2 and 3A, the downcomer tube arrangement 19, 20 forming that part of the water circulation system which is modified when applying the invention, consists of two parts, wherein the first downcomer tubes 19 end substantially at the point where the screen tubes 23 are connected on the front wall of the boiler.

The nose arch arrangement 7 comprises a lower wall 7a on the side of the furnace, directed from the rear wall 2 of the boiler substantially towards the front wall 1 of the boiler. Further, the nose arch arrangement 7 comprises a tip 7b directed substantially upwards from the front edge of the lower wall 7a. An upper wall 7c is directed from the upper edge of the tip 7b of the nose arch arrangement diagonally upwards away from the front wall 1 of the boiler. The nose arch arrangement 7 ends in the vertical grid tube system 13.

When operating in the first efficiency range of the method (FIGS. 1A, 2A2 and 3A), the open space 10 is empty and in heat radiation contact with the furnace 6 through the opening 11.

Consequently, FIGS. 1A, 2A2 and 3A show alternatives of the first embodiment of the water circulation system, wherein the FIGS. 1A, 2A2 and 3A show constructions in which the riser tube construction 15, 16 is installed as an entity in the boiler bank area and that part which will be used in the second embodiment of the water circulation system is preinstalled and connected to the boiler drum 18 via the downcomer tube arrangement 19, 20.

Figure 2A:
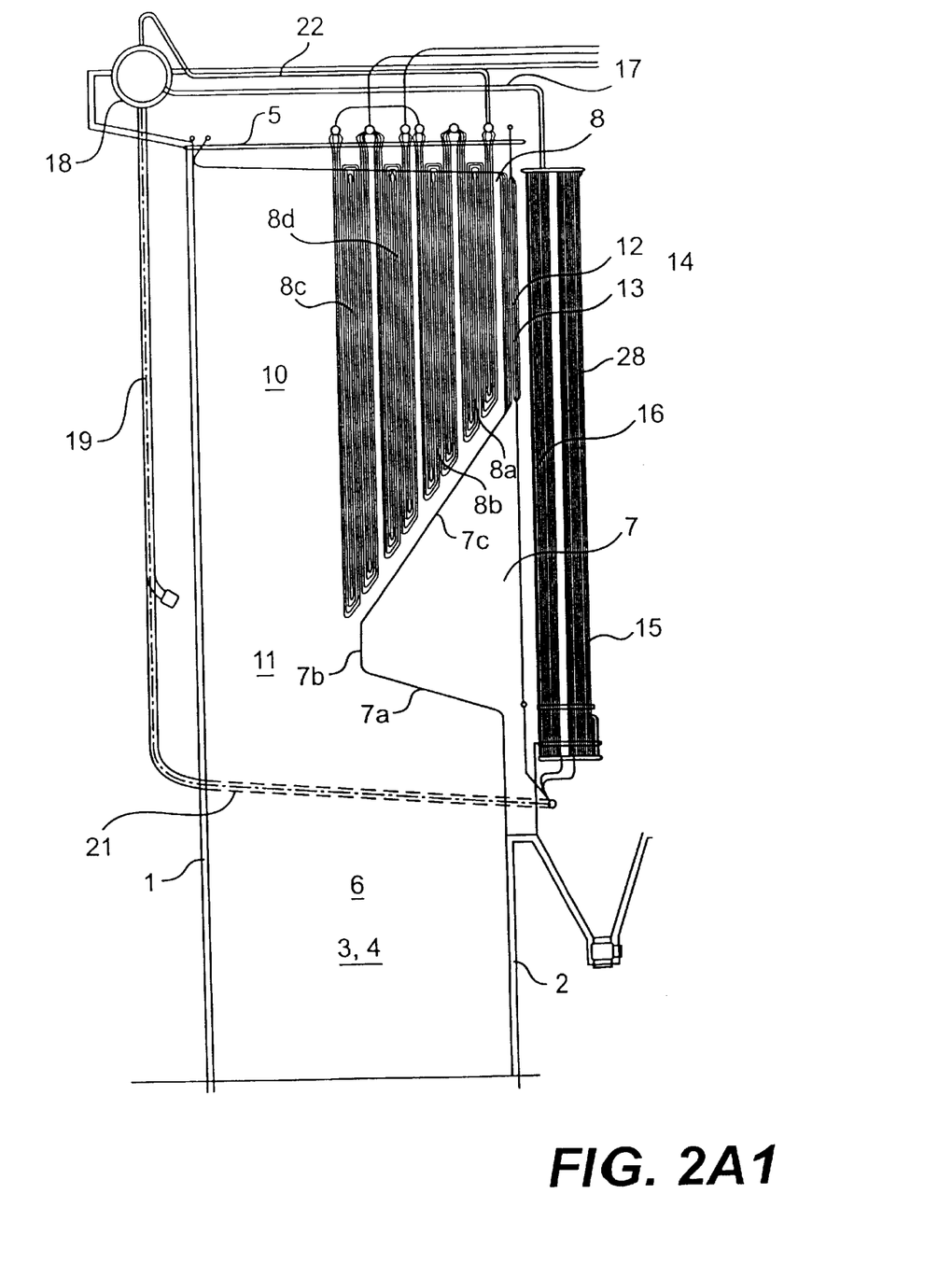
Figure 2A:
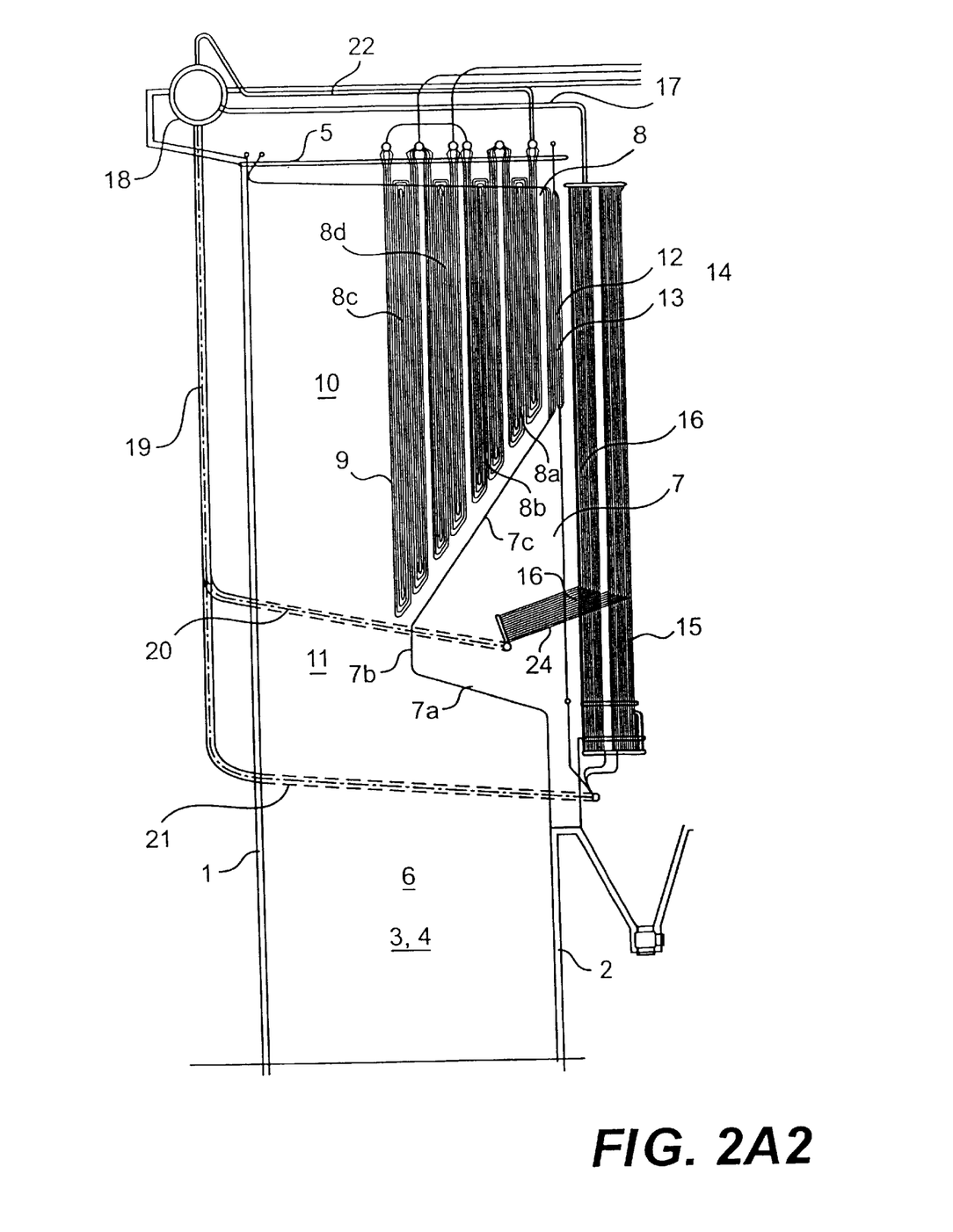

FIG. 2A1 shows the first embodiment of the water circulation system, wherein a space 28 (shown by broken lines in FIG. 2A1) is arranged in connection with the riser tubes 15, 16, and provided with supplementary riser tubes in connection with the second embodiment. For example, the riser tubes 15 and/or 16 are arranged in. the construction of FIG. 2A1 in a way that supplementary riser tubes (15 and/or 16) can be provided in connection with the second embodiment of the water circulation system (FIG. 2B) and connected with the screen tubes 23. It should be noted that, for example, the embodiment of FIG. 2A1 can also be achieved in the embodiment of FIG. 3A by leaving out the riser tubes 16, whereby in front of the riser tubes 15 there is a space 28 (space reserve) for riser tubes 16 to be added later.

Figure 2B:
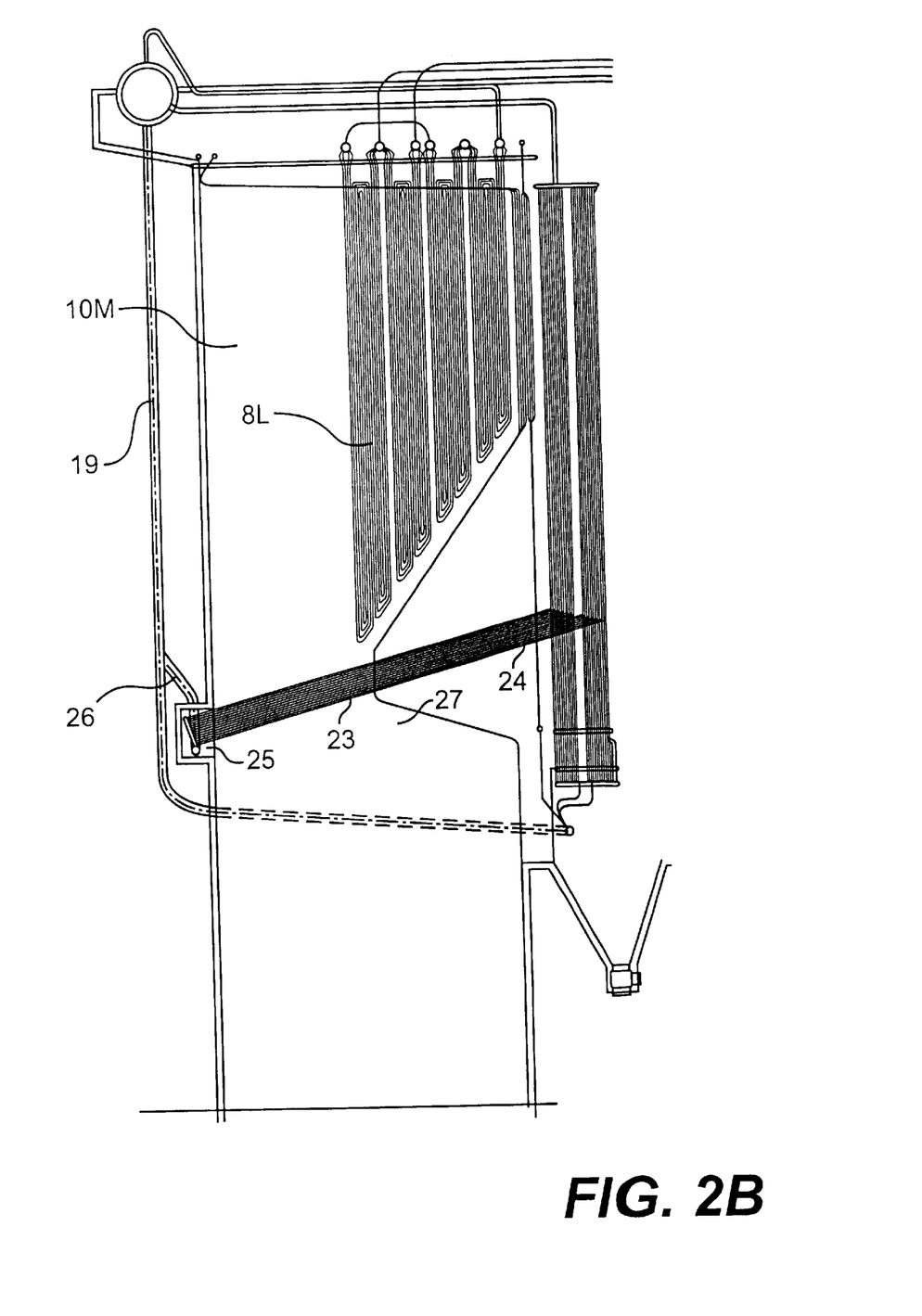
Figure 3A:
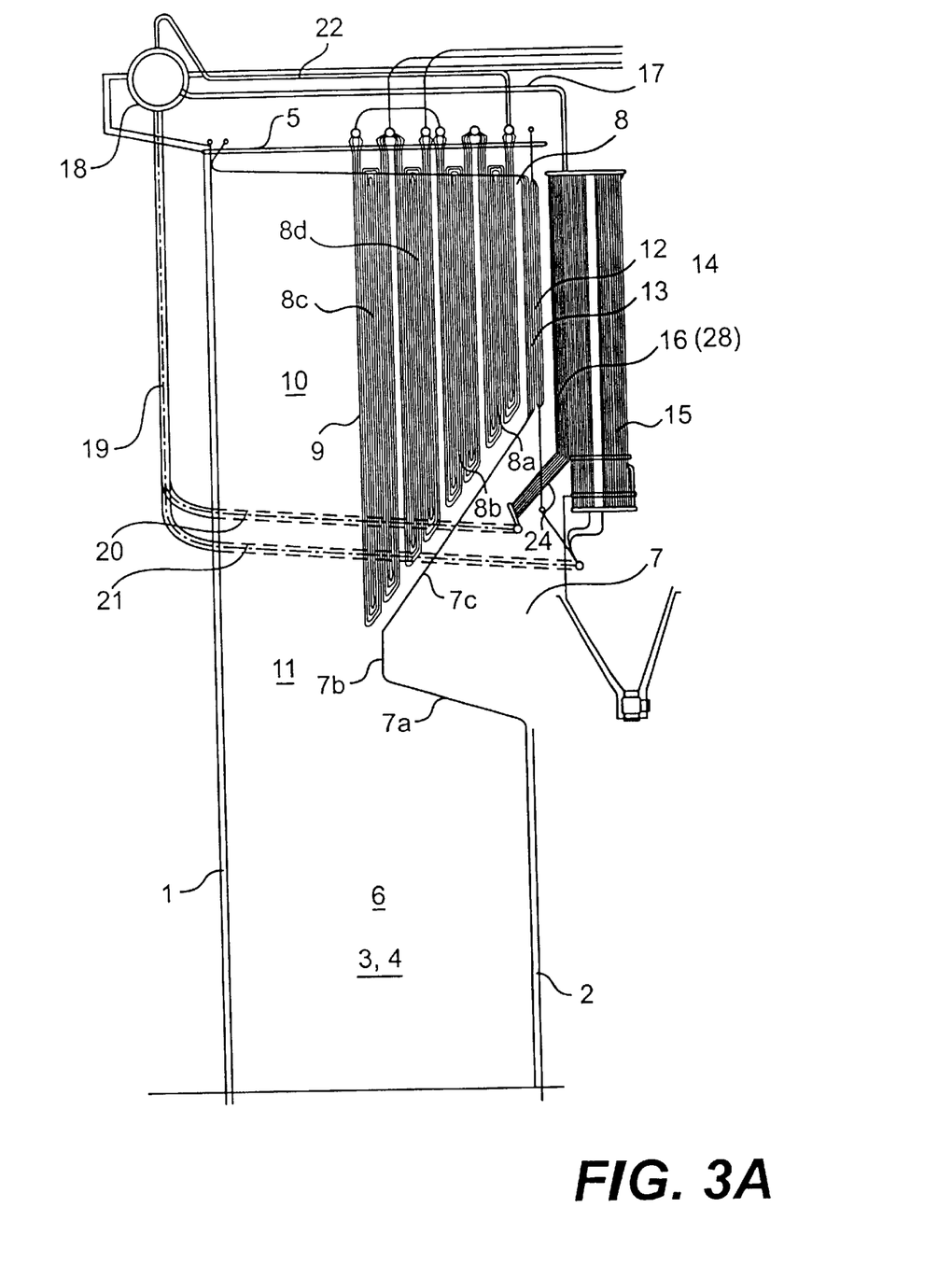
Figure 3B:
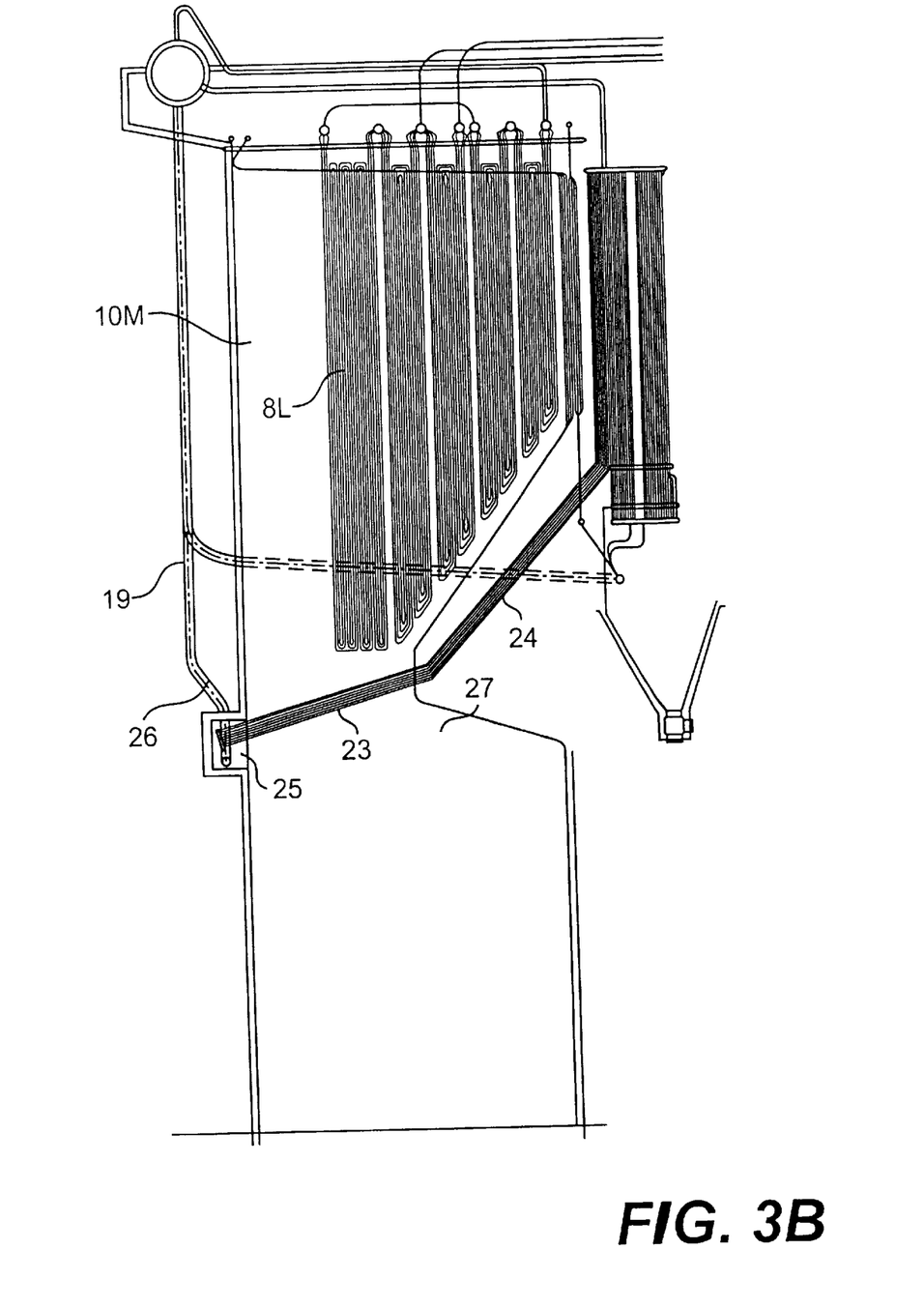

With particular reference to FIGS. 1B, 2B and 3B, when applying the method, alteration work of the boiler is carried out, wherein the basic superheater arrangement 8 (FIGS. 1A, 2A1, 2A2 and 3A) is expanded by placing element 8L expanding the basic superheater arrangement 8 in the open space 10. The open space 10 is dimensioned so that it can accommodate one or several elements 8L expanding the basic superheater arrangement 8.

In the presented embodiments of the basic superheater arrangement 8 shown in FIGS. 1A to 3A and 1B to 3B (and being thus common to all efficiency ranges) is comprised a primary superheater 8a connected by a bridge pipe 22 to the boiler drum 18, its steam part, and operating on the counterflow principle, and of another primary superheater 8b following the same, facing the front edge 9 of the basic superheater arrangement 8 and operating similarly on the counterflow principle. Further, the basic superheater arrangement 8 comprises a secondary superheater 8c placed at the front edge of the boiler and a tertiary superheater 8d placed between the secondary superheater 8c and the second primary superheater. The secondary superheater 8c and the tertiary superheater 8d operate on the principle of parallel flow with the flue gases.

In the situation shown in FIGS. 1B to 3B, the part 8L expanding the basic superheater arrangement 8 is preferably a second secondary superheater, but it can also be another part of the superheater arrangement e.g. according to the choice of construction for the basic superheater arrangement. For lowering the temperature of flue gases, as well as for converting the part 8L expanding the superheater arrangement in the open space 10 to a superheater operating on the convection principle, upon conversion to another efficiency range according to the invention, when necessary, the screen tubes 23 of the second embodiment of the water circulation system, consisting of a series of parallel tubes placed in the area of the opening 11, are placed inside the boiler. These screen tubes 23 are arranged to connect the front wall 1 of the boiler and the nose arch arrangement 7 in a way that they particularly penetrate the front wall 1 and the tip 7b of the nose arch arrangement. The screen tubes 23 are connected on one hand to the downcomer tubes 19 of the boiler drum and on the other hand to the steam generating riser tubes 16 of the screen tubes to replace the supplementary downcomer tubes 20 outside the boiler, shown in FIGS. 1A, 2A2 and 3A. As illustrated in FIGS. 1A, 2A2 and 3A, the lower part of the steam generating riser tubes 16 of the screen tubes 23 is equipped with a connection pipe arrangement 24 placed inside the nose arch arrangement 7, wherein the arrangements for changing the efficiency range can be made in a simple and effective way. In a corresponding manner, the front wall 1 of the boiler can be equipped with suitable inlets 25 for installation of the screen tube system 23, and these inlets are kept closed e.g. by refractory when operating in the first embodiment of the water circulation according to FIGS. 1A, 2A2 and 3A. According to FIGS. 1B, 2B and 3B, the downcomer tube 19 is equipped with connection pipes 26 which are connected to the screen tubes 23 outside the furnace 6 of the boiler.

FIGS. 1A and 1B show a boiler embodiment, in which the flow direction of the flue gases in the flue gas pass 14 is vertical and downwards. In connection with the first and second embodiments of the water circulation system, steam generating riser tubes 16 are used and, placed directly after the grid-tube system 13. The riser tubes 15, connected to the boiler drum 18 by supplementary downcomer tubes 21 in the lower part of the flue gas pass 14, are arranged in separate groups after the riser tubes 16, seen in the horizontal direction.

FIGS. 2A1, 2A2 and 2B show a boiler embodiment in which the flow direction of the flue gases in the flue gas pass 14 is vertical and downwards. In connection with the first and second embodiments of the water circulation system, a riser tube system 15, 16 is used, where the riser tubes 15 and 16 are parallel. If necessary, i.e. in the solution shown in FIG. 2A1, a space is reserved in the riser tube arrangement 15, 16 consisting of parallel riser tubes for riser tubes 16 according to the embodiment of FIG. 2B.

FIGS. 3A and 3B show a boiler embodiment in which the flow direction of the flue gases in the flue gas pass is horizontal and from the left to the right. The steam generating riser tubes 16 are placed in front of the riser tubes 15 directly after the grid-tube system 13 in a way shown in FIGS. 1A and 1B. Because of the construction, the riser tubes 15, 16 are shorter than in the above-mentioned embodiments, whereby the extension of the screen tubes placed in the inner part of the nose arch arrangement 7 forms an angle with the screen tubes 23 so that the screen tubes 23 and the lower part of the riser tubes 16 can be connected with a straight pipe inside the nose arch arrangement.

With reference to what has been presented above, it can be stated that the method of the invention is based on the fact that the entire superheater arrangement (i.e. the basic superheater arrangement 8 and at least one expanding part 8L to be placed in the open space 10, if necessary) is designed in a way providing the option of raising the capacity or efficiency of the chemical recovery boiler in at least one step so that the chemical recovery boiler plant can operate in at least one higher efficiency range. It should be emphasized that the screen tube system can be made according to the invention into a very safe construction, because it is short and rigid in the furnace area and can be supported securely against the structures of the boiler, its upper part.

The method consists thus of the following partial solutions to be considered:

The basic superheater arrangement 8 is constructed in a way that the first superheater 8c in the flow direction of the flue gases (in the situation of FIG. 1) is a convection superheater protected preferably entirely or partially by the nose arch arrangement 7 or this superheater 8c is the only superheater entirely under radiation.

The basic principle in the design of the entire superheater arrangement is to provide a sufficiently large open space 10 for a possible expanding part 8L to be installed later. If necessary, the nose arch arrangement 7 is formed as a so-called back drawn nose arch arrangement, wherein the grid-tube system 13 is placed horizontally further from the front wall 1 than the rear wall 2 of the boiler. As a result, a sufficiently large open space 10 is obtained in the flow direction of the flue gases before the front edge 9 of the superheater arrangement (without losing superheating efficiency). This open space can accommodate, if necessary, at least one 8L or possible several supplementary parts expanding the superheater arrangement (space 10M, FIGS. 1B to 3B).

Upon application of the method in its first efficiency range, no screen tubes are constructed in the boiler on the furnace side.

The steam generating riser tubes 16 and connection pipes 24 are constructed ready in the boiler bank area.

Upon application of the method in one or several efficiency ranges higher than the first efficiency range, the furnace area is provided (optionally or in connection with the part expanding the basic superheater unit) with a screen tube system 23 starting from the front wall 1 of the furnace and joining the possibly preconstructed riser tubes 16 of the screen tubes, i.e. their connection pipes 24.

The preconstructed riser tubes 16 of the screen tubes are provided with separate second supplementary downcomer tubes 20 as an extension of the first downcomer tubes 19 starting from the boiler drum. In the second efficiency range, the first downcomer tubes 19 can be used as part of the downcomer tubes feeding the screen tubes 23 starting from the front wall of the furnace (FIGS. 1B to 3B).

The roofing 5 and other parts of the furnace are already designed at the planning stage for adding a new part 8L expanding the basic superheater arrangement 8 it necessary.

The connection pipe arrangement 24 and the separated steam generating riser tubes 16 can be in front of the riser tubes 15 forming the boiler bank, as presented here, but also between the riser tubes 15 or even as a part of the actual riser tube elements.

The medium flowing in the screen tube system 23 can be water, a mixture of water and steam, saturated or superheated steam.

Both the front wall 1 and the tip 7b of the nose arch are equipped, if necessary, with inlets for installation, and they are kept closed when operating in the first efficiency range.

Thus, as to the terminology used, it can be stated that at the first stage of the method, a downcomer tube arrangement 19, 20 is applied, with a first part 19 and a second part 20. At the further stage(s) of applying the method, the first part 19 of the downcomer tube arrangement is connected to the screen tubes 23 to be placed inside the boiler. Thus, the tubes 19, 20, 21 and 23 constitute the connecting pipes which are used in the method, where applicable.

The partial solutions presented above give the following advantages. In connection with raising the capacity, or efficiency, of the chemical recovery boiler, a large open space 10 is available for accommodating at least one new part 8L expanding the basic superheater arrangement. Because of the increased temperature of the flue gases, the radiation superheaters can be protected, if necessary, with a screen tube system 23 which will help to lower the temperature and thus also the flow rate of the flue gases and to reduce the risk of plugging, when the capacity is increased. When implemented according to the method of the invention, the construction of the screen tubes 23 is safe and reliable.

What is claimed is:

1. Method for upgrading a boiler, wherein the boiler comprises in an upper part of a furnace:

a nose arch arrangement in which
a lower wall is directed from a rear wall of the boiler towards the furnace of the boiler, wherein the lower wall is provided with a tip which includes an upper wall directed from the tip of the nose arch arrangement diagonally upwards away from a front wall of the boiler, wherein the nose arch arrangement ends in a grid-tube system extending vertically from an upper edge of the upper wall of the nose arch arrangement substantially to roofing of the boiler, forming a flue gas outlet from the boiler;

a basic superheater arrangement placed substantially between the upper wall of the nose arch arrangement and the roofing, an open space between a front edge of the basic superheater arrangement and the front wall of the boiler, being in flow communication of the flue gases to the furnace through an opening between the front wall of the boiler and the tip of the nose arch arrangement, and wherein the boiler further comprises:

a boiler drum, connecting pipes including downcomer tubes and screen tubes connected to the boiler drum, riser tubes placed after a grid-tube system in the flow direction of the flue gases, in the area of a boiler bank, connected to the connecting pipes, and upper circulation pipes connecting an upper part of the riser tubes and the boiler drum, the method comprising the steps of:

using the boiler at a first boiler capacity by: keeping the open space in radiation contact with the furnace and empty, and using in connection with the riser tubes a first set of the water circulation system connected to the boiler drum, using the boiler at a least one other boiler capacity exceeding the first boiler capacity, by placing at least one part expanding the basic superheater arrangement in the open space.

2. Method according to claim 1, further comprising forming the first set of the water circulation system by combining the boiler drum with the downcomer tubes outside the boiler for at least part of the riser tubes.

3. Method according to claim 1, further comprising forming the first set of water circulation system by arranging a space in connection with the riser tubes for accommodating supplementary riser tubes.

4. Method according to claim 1, further comprising forming the second set of the water circulation system by connecting the boiler drum by the screen tubes connected at their first end to a part of the downcomer tubes and placed to connect the front wall of the boiler and the nose arch arrangement, and connecting second end of the screen tubes to the riser tubes.

5. Method according to claim 4, wherein the screen tubes pass through the nose arch arrangement at the tip of the nose arch arrangement.

6. Method according to claim 4, wherein the front wall is equipped with inlets for installation of the screen tubes and method further comprises closing the inlets when operating at the first boiler capacity.

7. Method according to claim 4, further comprising connecting a connection pipe arrangement with the riser tubes, inside the nose arch arrangement, and connecting the riser tubes alternatively to the downcomer tubes or to the screen tubes by means of the connection pipe arrangement.

8. Method according to claim 4, further comprising using a flow medium in the screen tubes and the riser tubes which medium is one of water, a mixture of water and steam, saturated steam and superheated steam.

9. Method according to claim 4 further comprising connecting the second end of the screen tubes to supplementary riser tubes placed in a space arranged in the riser tubes.

10. Method according to claim 1, wherein the nose arch arrangement is arranged to be drawn back, a wherein the grid-tube system is placed horizontally further from the front wall of the boiler than the rear wall of the boiler.

11. Method according to claim 1, further comprising placing at least one additional superheater unit in the open space as one of the parts expanding the superheater arrangement.

12. Method according to claim 1, further comprising connecting a connection pipe system with steam generating ones of the riser tubes in connection with riser tubes forming the boiler bank, wherein the steam generating ones of the riser tubes are placed in the incoming direction of the flue gases in front of and/or between the riser tubes forming the boiler bank.

13. Method according to claim 1, wherein the riser tubes are placed parallel or perpendicular to the flue gas flow.

14. Method according to claim 1 further comprising at the at least one other boiler capacity, forming in connection with the riser tubes the second set of the water circulation system connected to the boiler drum, the second set of the water circulation system being placed partially in the furnace and having a capacity exceeding that of the first set of the water circulation system.

* * * * *

UNITED STATES PATENT AND TRADEMARK OFFICE
CERTIFICATE OF CORRECTION

PATENT NO. : 6,178,924 B1
DATED : January 30, 2001
INVENTOR(S) : Aki Hakulinen et al.

It is certified that error appears in the above-identified patent and that said Letters Patent is hereby corrected as shown below:

Title page,
Item [75], Inventors should read -- Aki Hakulinen; Kari Haaga, both of Tampere (FI) and Kai Mäenpää, of Siivikkala (FI) --

Signed and Sealed this

Twelfth Day of February, 2002

Attest:

Attesting Officer

JAMES E. ROGAN
Director of the United States Patent and Trademark Office